United States Patent [19]
Woodford

[11] Patent Number: 5,186,124
[45] Date of Patent: Feb. 16, 1993

US005186124A

[54] TOOTH CLEANING TOY FOR CATS AND METHOD FOR ITS MANUFACTURE

[76] Inventor: Richard L. Woodford, 110 S. Irving, Tucson, Ariz. 85711

[21] Appl. No.: 881,227

[22] Filed: May 11, 1992

[51] Int. Cl.⁵ ............................................. A01K 29/00
[52] U.S. Cl. ..................................... 119/29; 606/235
[58] Field of Search ................. 119/29, 29.5; 606/234, 606/235; 128/62 A

[56] References Cited

U.S. PATENT DOCUMENTS

| | | | |
|---|---|---|---|
| 1,623,969 | 4/1927 | Palmer | 606/235 |
| 2,185,547 | 1/1940 | Fowler | 46/1 |
| 3,107,651 | 10/1963 | Beck | 119/29 |
| 3,123,047 | 3/1964 | Fisher | 119/29.5 |
| 3,198,173 | 8/1965 | Fisher | 119/29 |
| 3,441,001 | 4/1969 | Fisher | 119/29 |
| 4,513,014 | 4/1985 | Edwards | 119/29.5 |
| 4,924,811 | 5/1990 | Axelrod | 119/29 |

FOREIGN PATENT DOCUMENTS 2710576 9/1978 Fed. Rep. of Germany ........ 119/29

*Primary Examiner*—Robert P. Swiatek
*Assistant Examiner*—Todd E. Manahan
*Attorney, Agent, or Firm*—Antonio R. Durando; Harry M. Weiss

[57] ABSTRACT

A tooth-cleaning toy for cats that is made with fin-fish skin, particularly shark skin. The meat of the fish is scraped almost entirely from the hide, leaving a thin layer of meat for flavor. The scraped skin is then cut into the desired shape, normally strips, and dried for about ten hours at warm temperature, preferably in an inert atmosphere. The resulting product is leathery and features a distinctive fish odor, which is attractive to cats. In use, the product is softened by the saliva and reshaped by the chewing action of the cat, but it maintains its integrity and attractiveness for repeated enjoyment by the animal.

12 Claims, No Drawings

TOOTH CLEANING TOY FOR CATS AND METHOD FOR ITS MANUFACTURE

BACKGROUND OF THE INVENTION

1. Field of the Invention

This invention is related to the general field of animal toys and pacifiers, such as artificial bones and coiled rawhide strips for dogs. In particular, the invention provides a tooth cleaning toy especially designed for cats and a method for its manufacture from fin fish skin.

2. Description of the Prior Art

Everyone knows that dogs like to play with chewable toys and that the activity is helpful in keeping their teeth clean. Therefore, it is highly recommended that dog pets be provided with real bones or artificial substitutes for their day-to-day playful enjoyment and tooth care. Many different products have been developed toward both ends.

Fowler U.S. Pat. No. 2,185,547 (1940), describes a version of the classic dog bone. It consists of an object shaped like a bone and covered with a layer of untanned, dry, beef hide. The cover is made of two portions stitched together around the bone-shaped core.

Beck U.S. Pat. No. 3,107,651 (1953) discloses an edible toy ball for dogs. It is made of a strip of digestible material rolled around an axis perpendicular to its length. Since the width of the strip gradually decreases from a size corresponding to the desired ball diameter to a thin line, the wrapping of the strip around itself causes it to produce a well rounded ball of chewable material.

Fisher U.S. Pat. No. 3,123,047 (1964) shows a simulated animal bone and pacifier constructed with molded rawhide. The rawhide is either shaved, shredded, or beaten into pieces and then wetted and molded into the desired form. Then it is dried to produce various shapes of molded bones.

Finally, Fisher U.S. Pat. No. 3,198,173 (1965) describes a coiled rawhide animal toy. The toy consists of a strip of hide rolled into an elongated coiled configuration that provides the animal with an attractive geometry to play with. Because the hide is digestible, it is an acceptable solution for owners in order to provide their dogs with the necessary means for cleaning their teeth.

These animal toys are effective for dogs, but none seem to appeal to the curiosity and needs of cats. In particular, cats are generally not attracted by rawhide, which is the main constituent of most chewable toys for animals. Therefore, there still exists a need for a toy that is specifically designed to provide cats with a chewable instrument capable of cleaning the cat's teeth while the animal is playing with it.

BRIEF SUMMARY OF THE INVENTION

One objective of this invention is the development of a chewable toy for cats that the animal is not likely to ingest while playing with it, and that would be harmless if ingested.

Another objective of the invention is a toy that cleans the teeth of the cat as a result of the chewing action of the animal during play.

A further goal of the invention is a toy that retains its appeal to a cat and that is not easily destroyed by virtue of the cat chewing it, so that it is suitable for repeated use.

A final objective of the invention is a method of manufacture of the toy that is easy, economical and based on the utilization of commercially available ingredients and equipment.

According to these and other objectives, the present invention describes a tooth-cleaning toy for cats that is made with fin-fish skin, particularly shark skin. The meat of the fish is scraped almost entirely from the hide, leaving a thin layer of meat for flavor. The scraped skin is then cut into the desired shape, normally strips, and dried for about ten hours at warm temperature, preferably in an inert atmosphere. The resulting product is leathery and features a distinctive fish odor, which is attractive to cats. In use, the product is softened by the saliva and reshaped by the chewing action of the cat, but it maintains its integrity and attractiveness for repeated enjoyment by the animal.

Various other purposes and advantages of the invention will become clear from its description in the specifications that follow and from the novel features particularly pointed out in the appended claims. Therefore, to the accomplishment of the objectives described above, this invention consists of the features hereinafter fully described in the detailed description of the preferred embodiment and particularly pointed out in the claims. However, such description discloses but one of the various ways in which the invention may be practiced.

DETAILED DESCRIPTION OF THE INVENTION

This invention lies in the realization that cats have a particular affinity for the kind of fish classified as fin fish by the United States Department of Agriculture (see USDA Handbook No. 7). This class of fish includes shark and ray, both of which have a skin that is suitable for manufacturing chewable strips that provide both an attractive toy and a useful tooth-cleaning tool for the animal. Therefore, a method is described to produce dried strips of fin fish skin that can be chewed repeatedly without significant deterioration. Although the entire description is made with reference to shark skin, it is understood that the same procedure is applicable to the skin of ray or other fish classified as fin fish.

Whenever possible, the best source of fish skin for the purposes of this invention is from fresh fish, in order to avoid the formation of ureic compounds that soon begin to appear around the skin of unrefrigerated fish after it is caught and taken out of the water. Otherwise, it is recommended that the skin be either refrigerated or frozen during the time of transport to the point of manufacture.

Since the skin of sharks normally retains visible amounts of meat attached to it, it must be scraped to the point where only a very thin layer is left. Most cats like fish meat in general and the purpose of this thin layer is to leave a residue of meat that retains a fish odor, even after drying, and renders the product attractive to them. A layer a fraction of a centimeter in thickness (e.g., 0.1 to 1.0 mm) is sufficient to give the product a long lasting fish odor. Thus, the shark skin is scraped to a uniform thickness while in large pieces, or spreads, as obtained from peeling it off the dead fish.

The scraped skin is then cut to the desired size, normally in strips about 2–5 centimeters wide and 10–20 centimeters long, large enough that a cat would not be able to swallow the strip while playing with it. If the shark skin is available frozen, as is normally the case away from fishing locations, it is preferable to cut it while in its frozen condition and then soak it in water to prepare it for dehydration.

The strips of shark skin are then dried at warm temperature, such as provided by a conventional laboratory dehydrator, to the point where its water content is less than 5 percent by weight. It is recommended that the moisture in the final product not be lowered too much because a very low percentage tends to make the skin brittle and subject to rupture during playful chewing by a cat, with the unwanted effect that the resulting pieces may become ingested in the process. I found that the moisture range for best results is 2-5 percent, which can be achieved by letting the strips of shark skin stand in a standard drier for about ten hours at 50°C. If the resulting product is packaged in an inert atmosphere to inhibit its oxidation and deterioration, such as in nitrogen, a higher percentage of moisture may be left in the shark skin without affecting its durability and shelf life. A shelf life of at least six months may be expected from the dried shark skin prepared according to this process. If desired, the shelf life of the product may be further lengthened by adding traces of a food preservative substance, such as sodium or potassium nitrate, to the fish skin before dehydration. This is best accomplished by soaking the skin in a nitrate solution before drying. It is to be noted, though, that the addition of a preservative is not necessary for a six-month shelf life if the moisture content is kept below 5 percent. For long-term mold control, the product may be treated with sodium benzoate by soaking it in a 0.05 percent by weight aqueous solution for about 20 minutes before dehydration.

While not critical to the invention, it is clear that the pieces of shark skin may be cut and shaped to any desired configuration to best suit their appeal to the cat pets for which they are intended. For instance, narrow strips may be rolled around a support frame, as illustrated in U. S. Pat. No. 3,198,173, cited above, to produce a coiled shark-skin toy with an attractive geometry for a cat to play with. Strips of skin could be similarly twisted to acquire a corkscrew appearance. In all cases, though, if shaping is desired, the skin must be wetted and shaped, and then dried according to the process described above.

I found that the product obtained after dehydration is very attractive to cats, both in terms of texture and smell. They tend to play with it and chew on one end while holding on the other end; the saliva released during chewing moistens the skin and renders it soft and pliable, but the skin's structure remains intact, so that it normally does not tear into separate pieces. When left alone, the skin dries up again and it reconstitutes into a product having approximately the same properties exhibited before chewing. This remains valid through numerous cycles of use by a cat.

During the chewing process, a cat typically sinks his teeth into the moistened shark skin in order to extract its flavor. It is also normal for the cat to rub the skin against his gums as a way of savoring the latent fish taste. As a result of these efforts, the teeth are necessarily cleaned by the wiping action of the shark skin against the surface of the teeth and gums while the cat is playing with it.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

What I claim as my invention is:

1. A chewable toy for cats, comprising a strip of fin-fish skin containing a layer of fish meat and dehydrated to a moisture content between 2 and 5 percent by weight.

2. The chewable toy described in claim 1, wherein said fin-fish skin consists of shark skin.

3. The chewable toy described in claim 1, wherein said fin-fish skin consists of ray skin.

4. The chewable toy described in claim 1, wherein said layer of fish meat is approximately 0.1 to 1.0 millimeter thick.

5. The chewable toy described in claim 1, wherein said strip is about 2-5 centimeters wide and 10-20 centimeters long.

6. A process for manufacturing a chewable toy for cats, comprising the following steps:
   (a) scraping a spread of fin-fish skin to remove all fish meat attached to it, except for a layer of meat left on the skin to give it long lasting fish odor;
   (b) cutting said spread of fin-fish skin into pieces of a size sufficiently large to prevent ingestion by a cat; and
   (c) drying said pieces to a moisture content between 2 and 5 percent by weight.

7. The process described in claim 6, wherein said fish skin consists of shark skin.

8. The process described in claim 6, wherein said fish skin consists of ray skin.

9. The process described in claim 6, wherein said layer of meat left on the skin to give it long lasting fish odor is less than one millimeter thick.

10. The process described in claim 6, wherein each of said pieces consists of a strip about 2-5 centimeters wide and 10-20 centimeters long.

11. The process described in claim 6, further comprising the step of soaking the skin in a 0.05 percent by weight sodium benzoate aqueous solution for approximately 20 minutes before drying.

12. The process described in claim 6, wherein said step of drying said pieces to a moisture content between 2 and 5 percent is accomplished by exposing them to a temperature of approximately 50 for about ten hours in a dehydrator.

* * * * *